Oct. 17, 1933.  G. E. A. HALLETT  1,930,554
HYDRAULIC VALVE MECHANISM
Filed Jan. 10, 1927
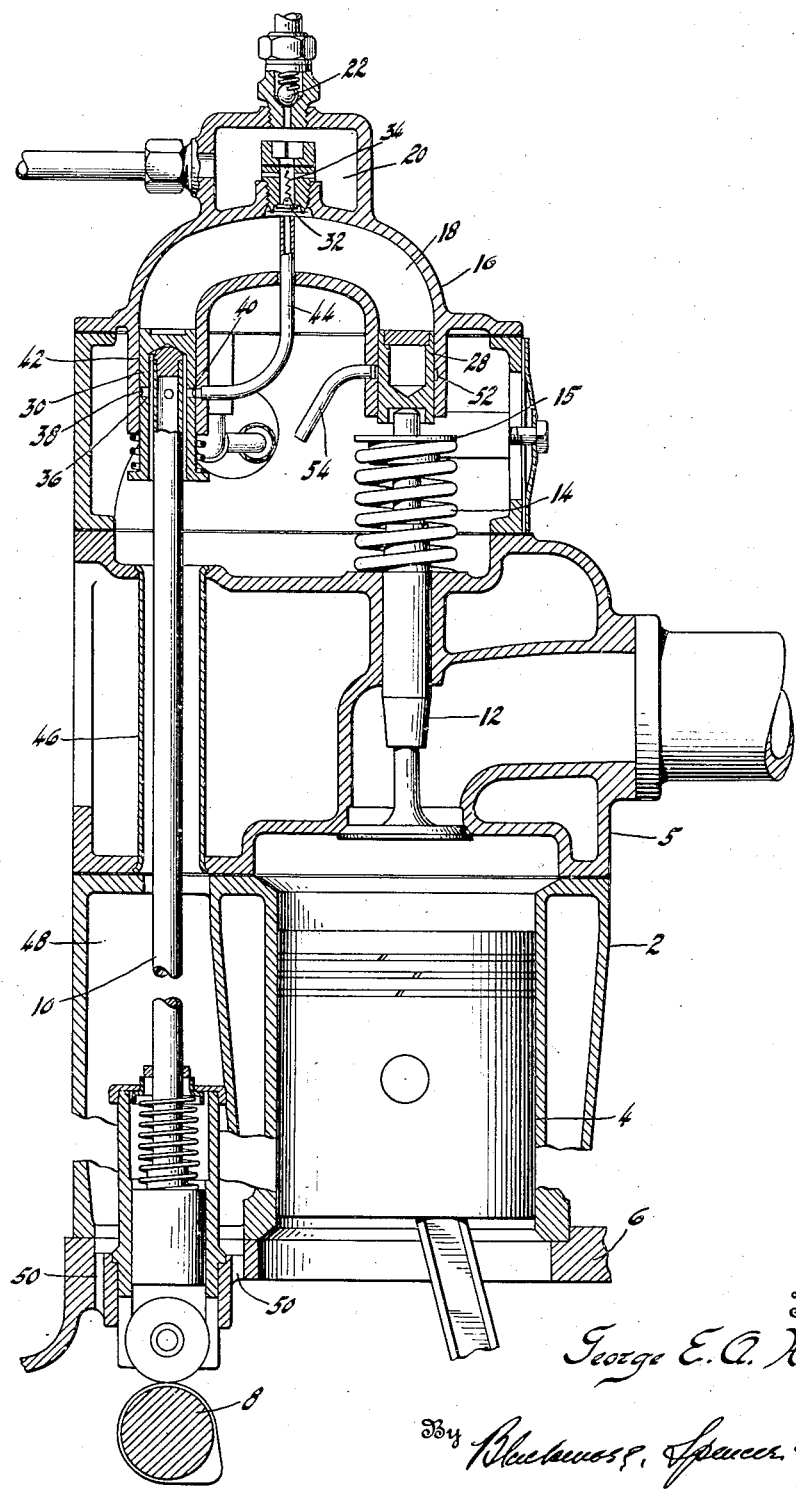
Inventor
George E. A. Hallett
By Blackmore, Spencer, & Fish
Attorneys Patented Oct. 17, 1933

1,930,554

UNITED STATES PATENT OFFICE 1,930,554

HYDRAULIC VALVE MECHANISM

George E. A. Hallett, Detroit, Mich., assignor to General Motors Research Corporation, Detroit, Mich., a corporation of Delaware Application January 10, 1927. Serial No. 160,244

6 Claims. (Cl. 123—90)

This invention relates to hydraulic mechanism for operating engine valves and similar devices in which a body of fluid is interposed in the connections serving to transmit motion from the operating part to the operated part.

One feature of this invention consists in the provision of means for removing air from the fluid body so as to insure that the valve will be moved through its full stroke.

Such devices operate by reason of the fact that fluids are substantially incompressible and transmit to the operated part the energy impressed upon them by the operating part. Obviously if the fluid chamber is but partly filled with fluid, the remainder of the space being occupied by air which has found its way into the chamber, the movement of the operating part will merely cause alternate compression and expansion of the body of air without effecting movement to the operated part, at least to its fullest extent.

One feature of the present invention consists in the provision of means for removing air from the fluid body as to insure that the valve will at all times be moved throughout its full stroke. The means which I employ is preferably continuously effective throughout the operation of the engine and consists in an outlet for air which is effective only during the non-actuating portion of the stroke of the valve operating means. Thus I may employ a mechanically operated valve which, at the proper time in the cycle is opened to permit escape of air. For simplicity I have preferably combined this valve with one of the moving parts of the hydraulic mechanism such as the actuating plunger which impresses upon the fluid body the force to be transmitted to the valve. The air outlet communicates with the chamber at the point where the air collects, that is, at the highest point in the chamber.

In the preferred form of my invention the air, mixed with fluid, is conducted downwardly from the highest point in the chamber, and to accomplish this in the face of the higher specific gravity of the oil unmixed with air, I have found it necessary to employ capillary passages.

Another feature of my invention consists in the provision of improved means to prevent fluid leaking from the chamber past the operated plunger from passing down the stem of the valve. This is accomplished by the provision of an oil collecting groove on the plunger or the bore in which the plunger reciprocates and a conduit for leading oil collected in the groove away from the valve stem.

The figure is a vertical section through a portion of an internal combustion engine to which my invention is shown applied.

Reference character 2 indicates an internal combustion engine having cylinders such as indicated at 4, of which there may be any desired number, cylinder head 5, crank case 6, cam shaft 8, tappets 10, and valves 12. The valves are of conventional type provided with springs 14, engaging abutment 15 on the stem to yieldingly hold the valves seated. On the head I have mounted a casting 16 in which are formed a plurality of fluid chambers 18, one for each valve, and a supply reservoir 20 which preferably extends the length of the engine and receives its supply of oil from the usual oiling system pump fed from the crank case. Chamber 20 is provided with a pressure relief valve 22 located at its highest so as to not only permit the maintenance of relatively fixed pressure in the chamber but also to permit ready escape of air. Oil passing through the relief valve is returned to the crank case.

In one end of each chamber 18 is slidably mounted plunger 28 having a socket in its outer end to receive the end of the valve stem. In the other end of the chamber is mounted a similar plunger 30 socketed to receive the end of tappet 10. It is apparent that upward movement imparted to the tappet by the cam shaft causes the plunger 30 to displace the fluid in the chamber 18, this displacement causing downward movement of plunger 28, and consequently opening of the valve 12.

At the highest point in the chamber 18 I have provided valve 32 yieldingly held upon its seat by spring 34. This valve is seated by pressure in the chamber 18 on the upward stroke of the tappet. On the downward stroke the valve opens to permit the inward flow of fluid from the reservoir 20 to replenish the supply in the chamber.

The skirt of plunger 30 is provided with apertures 36, communicating with peripheral groove 38, formed either in the skirt or in the bore 42 in which the plunger reciprocates. An aperture 40 is provided in the bore 42 which registers with the groove 38 during a certain portion of the stroke of the plunger. A tube 44, preferably of capillary dimensions establishes communication between this aperture and the chamber 18, preferably at the highest point thereof, where, in this embodiment the valve 32 is also located. Aperture 40 is preferably so located that it registers with groove 38 when the engine valve 12 is seated. At this time the inlet valve 32 is free to open and the chamber 18 is exposed to the pressure existing in the reservoir 20. The result is that the air usually in the form of an emulsion which may have collected in the upper portion of the chamber 18 is forced downwardly through tube 44 and is discharged through aperture 40, groove 38 and apertures 36 into the interior of plunger 30 whence it escapes. It is apparent that during the operating stroke of the plunger 30 the upward movement of plunger 30 seals the aperture 40 so that at this time no fluid can escape.

I find it best to make tube 44 of capillary dimensions. When the tube of such size is employed the discharge of air is facilitated, for the air is usually present in the form of an emulsion and passes readily through the tube.

It is obvious that some oil as well as air will be discharged into the interior of plunger 30. As the entire valve mechanism is inclosed as shown on the drawing, this oil must finally drain back to the crank case through the tube 46 surrounding the tappet, the tappet chamber 48 and the openings 50 connecting the tappet chamber with the crank case.

I have shown the operated plunger 28 encircled by a groove 52 which may be formed in the plunger, but is preferably formed in the bore in which the plunger slides. A tube 54 leads oil collected in the groove to some convenient point away from the valve 12 whence it may drain back into the crank case. By this means I effectively prevent the oil from running down the valve stem upon the seat where it may carbonize and interfere with the seating of the valve or into the combustion chamber.

While I have shown my invention applied to an engine of the overhead valve type it is obvious that it is equally applicable to engines having other valve arrangements, the plungers in that case being alined. If desired the operating and operated plungers may be of different sizes to produce any desired ratios between the movements of the plungers and the forces exerted by them.

It is likewise obvious that while I have employed the operating plunger to act as a mechanically operated vent, I may, if desired, employ the operated plunger instead; and that, if utmost simplification is not important, I may even employ a separate positively operated valve or similar means for the purpose.

I claim:

1. In hydraulic mechanism, the combination of operating mechanism, operated mechanism, a body of fluid interposed between said mechanisms and adapted to transmit motion between said mechanisms, air venting means comprising a tube of capillary dimensions communicating with said chamber at its highest point and extending downwardly therefrom, and a mechanically operated valve for said vent.

2. In a device of the class described, in combination with a closed hydraulic fluid casing, an actuator cylinder, a plunger in said actuator cylinder, and valvular air bleed means in said plunger communicating with the interior of said casing.

3. In a hydraulic actuator device, a hydraulic fluid casing, a fluid supply manifold, a non-return valve opening from said manifold to said casing, timed mechanism imposing pulsating pressure on fluid in said casing, and an outlet valve opened by said timed mechanism from a region of air accumulation in said casing intermediate of the imposing of pressure on fluid in said casing.

4. In a hydraulic actuator device, a hydraulic fluid casing, a fluid supply manifold, a fluid supply valve sensitive to differential pressures in said manifold and said casing, timed mechanism imposing pulsating pressure on fluid in said casing, and an outlet valve opened by said timed mechanism from a region of air accumulation in said casing intermediate of the imposing of pressure on fluid in said casing.

5. In a hydraulic actuator device, a hydraulic fluid casing, a fluid supply manifold, a non-return valve opening from said manifold to said casing, an actuator plunger operating against fluid in said casing, plunger operating means, and an outlet valve opened by said means alternately to the operation of said plunger, said outlet valve opening from a region of air accumulation in said casing.

6. In hydraulic valve mechanism, the combination of an operating plunger, an operated plunger, a body of fluid interposed between said plungers and adapted to transmit motion between them, and means controlled by one of said plungers and in communication with the upper part of said chamber for venting the region of air accumulation in said body to permit discharge of air, said venting means comprising a tube of capillary dimensions in communication with said body of fluid.

GEORGE E. A. HALLETT.